(12) United States Patent
Yanai et al.

(10) Patent No.: US 6,388,019 B1
(45) Date of Patent: May 14, 2002

(54) STYRENIC RESIN COMPOSITION FOR BIAXIALLY STRETCHED SHEET

(75) Inventors: Hiroyuki Yanai, Hyogo; Syozo Yamamoto, Osaka; Shuji Yoshioka, Hyogo, all of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/592,850

(22) Filed: Jun. 13, 2000

Related U.S. Application Data

(62) Division of application No. 09/391,623, filed on Sep. 7, 1999, now Pat. No. 6,114,029, which is a division of application No. 08/838,334, filed on Apr. 8, 1997, now Pat. No. 6,048,609, which is a continuation-in-part of application No. 08/770,062, filed on Dec. 19, 1996, now abandoned, which is a continuation of application No. 08/397,500, filed on Mar. 2, 1995, now abandoned.

(30) Foreign Application Priority Data

Mar. 7, 1994 (JP) .............................................. 6-35855
Sep. 26, 1994 (JP) ............................................ 6-229988

(51) Int. Cl.⁷ .............................................. C08L 25/04
(52) U.S. Cl. ...................................................... 525/241
(58) Field of Search ......................................... 525/241

(56) References Cited

U.S. PATENT DOCUMENTS 3,992,486 A  * 11/1976  Lang ........................... 525/208
4,000,216 A  * 12/1976  Lang ............................ 525/66
5,237,004 A  *  8/1993  Wu .............................. 525/85
5,534,580 A  *  7/1996  Mitsui et al. ............... 524/417

* cited by examiner

Primary Examiner—D. R. Wilson
(74) Attorney, Agent, or Firm—Sughrue Mion, PLLC

(57) ABSTRACT

Disclosed is a biaxially stretched styrenic resin sheet obtained by biaxially stretching a resin composition comprising (A) a styrenic resin and (B) crosslinked styrenic fine particles having an average particle size of 0.5 to 15 μm in an amount of from 0.001 to 1% by weight based on the resin composition. The resin composition may further comprise (C) a rubber modified styrenic resin containing a rubber component having an average particle size of 0.1 to 4 μm in such an amount that the rubber component concentration attributed to the rubber modified styrenic resin is from 0.005 to 0.1% by weight based on the resin composition. The styrenic stretched sheets exhibit improved blocking resistance owing to fine unevenness uniformly formed on the surface thereof while retaining the transparency. Even when a number of the sheets or formings obtained therefrom are stacked, they are easily separated apart without blocking.

1 Claim, No Drawings

STYRENIC RESIN COMPOSITION FOR BIAXIALLY STRETCHED SHEET

This is a Divisional of application No. 09/391,623 filed Sep. 7, 1999, now U.S. Pat. No. 6,114,029, which is a Divisional of application Ser. No. 08/838,334 filed Apr. 8, 1997, now U.S. Pat. No. 6,048,609, which is a Continuation-In-Part of application Ser. No. 08/770,062 filed Dec. 19, 1996, now abandoned, which is a Continuation of application Ser. No. 08/397,500 filed Mar. 2, 1995, now abandoned, the disclosures of which are incorporated herein by reference.

FIELD OF THE INVENTION

This invention relates to a biaxially stretched styrenic resin sheet having high transparency which can uniformly be coated with silicone oil and exhibits satisfactory blocking resistance when stacked either as sheeting or as formings.

BACKGROUND OF THE INVENTION

A biaxially stretched styrenic resin sheet is widely used in the field of food wrapping because of its transparency and nerve. However, it shows a strong blocking tendency, and formings obtained therefrom such as containers are hardly separated apart when stacked.

In order to overcome the blocking problem, it has been proposed to incorporate rubber particles into a styrenic resin as disclosed in JP-A-50-74649 (the term "JP-A" as used herein means an "unexamined published Japanese patent application") and to apply silicone oil on the surface of the stretched styrenic resin sheet as disclosed in JP-A-52-8080. The rubber particles added to the styrenic resin matrix are projected on the surface on biaxial stretching to improve blocking resistance of the stretched sheet. However, the rubber particles are flattened on biaxial stretching so that the proportion of the rubber projected on the surface is hardly constant. An increased amount of rubber incorporated to ensure satisfactory blocking resistance tends to cause reduction in transparency. In addition, with an increase of the rubber content, foreign matter may be incorporated into the resin composition because of scorching of rubber during long run operation or scorching of recycle rubber added, resulting in poor appearance of the sheet and causing a sheet break.

It was suggested to decrease the rubber content by increasing the size of the rubber particles to, e.g., about 6 to 10 μm, but this method is accompanied with surface roughening or gloss reduction of the resulting biaxially stretched sheet.

It has also been proposed to incorporate synthetic silicon dioxide (JP-B-6-856, the term "JP-B" as used herein means an "examined published Japanese patent appplication") or a combination of silicon dioxide and styrene-grafted rubber (JP-B-6-855) to a styrenic resin so that the silicon dioxide may be projected on the surface of the sheet on biaxial stretching thereby to improve blocking resistance of the sheet. In these systems, however, the biaxially stretched sheet suffers from reductions in transparency and gloss because of a difference in a refractive index between silicon dioxide (refractive index: 1.3 to 1.45) and the styrenic resin matrix (refractive index: 1.55 to 1.59). Further, because silicon dioxide has poor wettability with the styrenic resin matrix, it falls off the matrix. Therefore, the resulting sheet has reduced physical properties and is of no practical use.

JP-B-47-2180 discloses a process of preparing a high molecular film (a polymer film) containing a fine particle having at least one functional group selected from an amino group, a hydroxyl group, a carboxyl group, an epoxy group and a maleic anhydride unit, but its application to a biaxially stretched styrenic resin sheet would not provide an article having an excellent transparency.

JP-B-55-7471 discloses a resin-composition having a fine particle polymer dispersed therein which provides an opaque, translucent, or delustered sheet but does not provide a biaxially stretched transparent styrenic resin sheet as disclosed in the present invention.

SUMMARY OF THE INVENTION

It is, therefore, an object of the present invention to provide a biaxially stretched styrenic resin sheet which has improved silicone oil coating properties, and does not suffer from deterioration of appearance, and breaks of the sheet.

It is another object of the present invention to provide a biaxially stretched styrenic resin sheet which insures enhanced blocking resistance while inhibiting deterioration of transparency of the sheet, so that even when a pile of the sheets is blanked, each sheet can easily be separated apart.

A further object of the present invention is to provide a process for manufacturing a biaxially stretched styrenic resin sheet which has such meritorious characteristics as mentioned above, in a simple and easy manner.

To accomplish these objects, the inventors of the present invention did much investigation, and have found that a resin composition comprising a styrenic resin as a matrix and fine particles of a crosslinked styrene-based resin whose refractive index is close to that of the styrenic resin matrix provides, upon being biaxially stretched, a biaxially stretched styrenic resin sheet having fine unevenness uniformly on the surface thereof. The crosslinked fine particles are not flattened on stretching and form fine projections on the surface of the stretched sheet. As a result, the biaxially stretched styrenic resin sheet has improved silicone oil coating properties, does not suffer from deterioration of appearance, breaks which tend to occur due to silicon dioxide added or scorch of the rubber added, and reduction of transparency, and exhibits improved blocking resistance so that even when a pile of a plurality of the sheets is blanked each sheet can easily be separated apart.

The biaxially stretched styrenic resin sheet of the present invention comprises a resin composition comprising (A) a styrenic resin and (B) crosslinked styrenic fine particles having an average particle size of 0.5 to 15 μm in an amount of from 0.001 to 1% by weight (10 to 10,000 ppm) based on the resulting resin composition (a first embodiment of the invention).

In the biaxially stretched styrenic resin sheet of the present invention, the resin composition may further comprise (C) a rubber modified styrenic resin containing rubber component particles (a second embodiment of the invention). The rubber component particles may, for example, have an average particle size of about 0.1 to 4 μm. The rubber modified styrenic resin is added such that the particulate rubber component concentration is from 0.005 to 0.1% by weight (50 to 1000 ppm) based on the total weight of the resulting resin composition. In this embodiment, the crosslinked styrenic fine particles may be added in an amount of about 0.001 to 1% by weight (10 to 10,000 ppm), preferably about 0.002 to 0.1% by weight (20 to 1,000 ppm) based on the resin composition.

The present invention further relates to a styrenic resin composition for the biaxially stretched sheet, a process for producing the biaxially stretched styrenic resin sheet, and a molded container as produced with the use of the biaxially stretched sheet.

DETAILED DESCRIPTION OF THE INVENTION

Component (A)

The amount of the styrenic resin is usually from about 90 to about 99.999% by weight (e.g., about 90 to about 99.9% by weight) based on the total weight of the resin composition.

The styrenic resin that can be used as a matrix in the present invention comprises at least one monomer unit derived from styrene monomers, such as styrene, an alkylstyrene (e.g., o-, m- or p-methylstyrene, p-ethylstyrene, p-isopropylstyrene, butylstyrene or p-t-butylstyrene); an α-alkylstyrene (e.g., α-methylstyrene or α-ethylstyrene); a halostyrene (e.g., o-, m- or p-chlorostyrene, bromostyrene or fluorostyrene); a di-, tri-, tetra- or pentasubstituted chlorostyrene, bromostyrene or fluorostyrene; and an α- or β-halostyrene (e.g., α-chlorostyrene, α-bromostyrene, β-chlorostyrene or β-bromostyrene).

The styrenic resin may further comprise other monomers copolymerizable with the styrene monomer, such as acrylonitrile, methyl methacrylate and maleic anhydride.

These styrenic resins can be employed singly or in combination.

A preferred styrenic resin includes a resin having high transparency, inclusive of polystyrene, a styrene-vinyltoluene copolymer, a styrene-α-methylstyrene copolymer, a styrene-methyl (meth)acrylate copolymer. Polystyrene can advantageously be used among others. Incidentally, the styrenic resin has a visible light transmittance of about 70 to 95%, preferably about 80 to 95%.

Methods for preparing the styrenic resin are not particularly limited.

The weight average molecular weight of the styrenic resin is usually from about 100,000 to about 500,000, preferably from about 150,000 to about 350,000, and more preferably from about 200,000 to about 350,000.

Component (B)

The crosslinked styrenic fine particles which can be used in the present invention preferably have a refractive index close to that of the styrenic resin used as a matrix. The refractive index of the crosslinked styrenic fine particles can be selected from a range not interfering with transparency of the biaxially stretched sheet, and is, for example, about 1.5 to 2.0, preferably about 1.5 to 1.8, and more preferably about 1.5 to 1.7. The refractive index may be evaluated by dispersing the fine particles in a liquid which has a known refractive index, holding the resultant dispersion between slide glasses, and comparing the refractive index of the dispersion with that of the liquid [see "Usage of Polarization Microscope" written by Kenya HAMANO, published by Gihodo].

The average particle size is generally from about 0.5 to about 15 $\mu$m (e.g., from about 1 to 10 $\mu$m), preferably from about 3 to about 12 $\mu$m (e.g., from about 3 to about 10 $\mu$m), more preferably from about 3 to about 8 $\mu$m (e.g., from about 3 to about 6 $\mu$m). The crosslinked styrenic particles may practically have an average particle size of from about 5 to about 10 $\mu$m. If it is less than 0.5 $\mu$m, too fine particles reagglomerate or reaggregate to cause insufficient dispersion in the resin matrix, which often develops fish eyes and deteriorates the outer appearance of the sheet. If it exceeds 15 $\mu$m, coarse grains impair the appearance and cause sheet breaks on stretching. The average particle size of the crosslinked styrenic fine particle may be determined as a 50% volume average particle diameter measured with a Coulter counter.

In the biaxially stretched styrenic resin sheet of the present invention, a ratio of the crosslinked styrenic fine particles is usually from about 0.001 to about 1% by weight (about 10 to 10,000 ppm), preferably from about 0.002 to about 0.1% by weight (about 20 to 1,000 ppm), more preferably about 0.003 to 0.09% by weight (about 30 to 900 ppm), and practically about 0.003 to 0.05% by weight (about 30 to 500 ppm) based on the total weight of the resin composition. In the first embodiment of the present invention, the crosslinked styrenic fine particles may also be used in an amount of from about 0.01 to about 1% by weight (about 100 to 10,000 ppm), preferably from about 0.02 to about 0.1% by weight (about 200 to 1,000 ppm) based on the total weight of the resin composition. The ratio of the crosslinked styrenic fine particles is practically from about 0.02 to about 0.09% by weight (about 200 to 900 ppm) based on the total weight of the resin composition. In the second embodiment of the present invention, the particles may, for example, be used in an amount of from about 0.01 to about 0.1% by weight (100 to 1,000 ppm), preferably from about 0.01 to about 0.06% by weight (100 to 600 ppm) based on the total weight of the resin composition. The ratio of the crosslinked styrenic fine particles in the second embodiment may practically about 0.003 to 0.01% by weight (about 30 to 100 ppm) based on the total weight of the resin composition.

If the amount of the crosslinked styrenic fine particles is less than the above-specified lower limit, the number of projections formed on the surface on stretching is too small to produce the effect of improving blocking resistance of the stretched sheet and particularly stacked sheet formed articles. If it exceeds the respective upper limit above specified, the particles tend to reagglomerate to reduce the transparency and appearance of the sheet and to cause breaks of the sheet on stretching.

The crosslinked styrenic fine particles may be prepared by polymerization of a vinyl monomer comprising an aromatic vinyl (e.g., styrene, vinyltoluene, α-methyl-styrene) as a main component, and a polyfunctional vinyl monomer. A preferred aromatic vinyl includes styrene. The aromatic vinyl may be employed in combination with other monomer (e.g., methyl methacrylate, (meth)acrylic acid, or other (meth)acrylic monomers). A ratio of the other monomer is usually about 10% by weight or less, and preferably about 5% by weight or less based on the total weight of the crosslinked styrenic particle. As the polyfunctional vinyl monomer, there may be mentioned, for instance, monomers each having about 2 to 4 vinyl groups, such as divinylbenzene, ethylene glycol di(meth)acrylate, propylene glycol di(meth)acrylate and the like. In general, the crosslinked styrenic fine particles can be obtained as a copolymer of a compound having a vinyl group and a crosslinking agent having at least two vinyl groups in one molecule, both can be radically polymerized. Examples of the former include a monovinyl compound such as styrene and (meth)acrylates, which may be used singly or in a combination thereof. Examples of the crosslinking agent include divinyl benzene, ethylene glycol di(meth)acrylate, and trimethylolpropane triacrylate.

The process of preparing the particles include a process which provides the polymer in the form of particles such as suspension polymerization, dispersion polymerization and emulsion polymerization, and a process which comprises grinding a polymer obtained by solution polymerization or mass polymerization.

Incidentally, the biaxially stretched styrenic resin sheet may further comprise heat resistant organic fine particles in addition to the component (B) as far as inhibiting thermal deformation at a temperature for extrusion molding, maintaining the shape of the particles and not adversely affecting transparency of the biaxially stretched sheet. Examples of the organic fine particle include fine particles of a resin having excellent heat resisting properties, such as thermosetting resins, their crosslinked products or cured products (e.g., phenol resins, urea resins, epoxy resins, unsaturated polyester resins, diallylphthalate resins), thermoplastic resins or their crosslinked products (e.g., poly(vinyl chloride) resins, poly(vinylidene chloride) resins, polycarbonate resins, polyamide resins, poly-sulfone). These heat resistant particles can be employed singly or in combination.

Component (C) (Rubber Particles)

The resin composition in the stretched sheet of the present invention may further comprise rubber particles.

The rubber particles may usually derive from a rubber component, preferably from a rubber component of a rubber-modified styrenic resin, in particular, from a rubber component of a grafted polymer (a grafted rubber). The rubber modified styrenic resin used in the resent invention can be prepared by a conventional method such as mass polymerization and suspension polymerization such that the obtained resin contains a diene rubber component having an average particle size of 0.1 to 4 $\mu$m.

The content of the rubber component in the rubber modified styrenic resin is generally from about 1 to 15% by weight, preferably about 3 to 10% by weight, and more preferably about 2 to 10% by weight based on the total weight of the rubber modified styrenic resin.

As the rubber component constituting the rubber particles, there may be mentioned, for example, various rubber polymers (e.g., butadiene rubber, isoprene rubber, an ethylene-vinyl acetate copolymer, an acrylic rubber, an ethylene-propylene rubber (EPDM)). Preferred examples of the rubber component include a diene polymer comprising at least one conjugated 1,3-diene, such as butadiene, isoprene, 2-chloro-1,3-butadiene, 1-chloro-1,3-butadiene, and piperine, and derivatives of these compounds. These rubber components may be employed singly or in combination.

The particles of the rubber component contained in the rubber modified styrenic resin has an average particle size of about 0.1 to 4 $\mu$m (e.g. about 0.1 to 3 $\mu$m), preferably about 0.3 to 2.7 $\mu$m, and more preferably about 0.5 to 2.5 $\mu$m. It the particle size is less than 0.1 $\mu$m, the size of the rubber projections formed on the surface of the stretched sheet is not sufficient for imparting blocking resistance to the surface particularly when the sheets are piled up and blanked. Large particles whose average diameter exceeds 4 $\mu$m cause surface roughening and reduction in transparency.

The rubber component concentration in the resin composition is from about 0.005 to about 0.1% by weight (about 50 to 1,000 ppm), preferably from about 0.006 to about 0.08% by weight (about 60 to 800 ppm) and more preferably from about 0.006 to about 0.06% by weight (about 60 to 600 ppm) based on the total weight of the resin composition. The content of the rubber component may practically be from about 0.01 to about 0.05% by weight (about 100 to 500 ppm) [e.g., about 0.01 to about 0.04% by weight (about 100 to 400 ppm)] based on the total weight of the resin composition. If the rubber component concentration is less than 0.005% by weight, silicone oil cannot be applied uniformly on the surface of the sheet. If the amount of the crosslinked styrenic fine particles is increased to compensate for the shortage of the rubber component concentration, increased agglomerates of the particles will roughen the surface of the sheet. If the rubber concentration exceeds 0.1% by weight, the transparency is reduced.

The term "average particle size" as used in this specification for the rubber component contained in the rubber modified styrenic resin denotes an average particle size (D) obtained from circle-equivalent diameters (diameter of the circle having the same area as the projected particle) measured on 1000 rubber polymer particles in a transmission micrograph taken of an ultra-thin section of a sample resin according to formula:

$$D=(\Sigma n i D i^4)/(\Sigma n i D i^3)$$

wherein ni represents the number of rubber polymer particles having circle-equivalent diameter Di.

If desired, the resin composition according to the present invention may further comprise additives, such as lubricants, plasticizers, and colorants.

The resin composition to be sheeted and stretched is prepared by dry blending a styrenic resin and crosslinked styrenic fine particles in a Henschel mixer, a twin-cylinder mixer, etc. or mixing master pellets of a resin composition containing a large amount of the organic fine particles with a styrenic resin.

The biaxially stretched sheet of the invention can be produced by melting and kneading the resin composition, extrusion-molding the kneaded product to a sheet, and stretching the sheet by means of a conventional stretching technology. The resin composition as a sheet is generally stretched at a temperature of about 110 to about 135° C., preferably from about 120 to about 125° C. The stretch ratio in each direction (lengthwise direction and traverse direction) is generally from about 1.5 to about 10, preferably from about 2 to about 5. It is preferred that the stretch ratio in each direction is 2.5.

The thickness of the stretched sheet obtained according to the present invention is generally from about 50 to 1000 $\mu$m, preferably about 100 to 500 $\mu$m and more preferably about 100 to 300 $\mu$m. The stretched sheet may practically have a thickness of from about 0.05 to 0.5 mm (50 to 500 $\mu$m), preferably from about 0.1 to 0.3 (100 to 300 $\mu$m).

A surface of the stretched styrenic resin sheet according to the present invention can be coated uniformly with silicone oil mainly comprising dimethylsilicon and having an Ostwald viscosity of 100 to 200,000 cSt (centistokes) at 20° C. or an emulsion thereof prepared by using an emulsifying agent, either alone or in combination with additives, such as an anti-fogging agent or an antistatic agent. A suitable spread of the silicone oil is preferably from about 10 to 150 mg/m$^2$, at which dryness to the touch is felt.

The stretched styrenic resin sheet of the invention has high transparency, blocking resistance (antiblocking properties) and excellent releasability, and when plural sheets pile up, they easily separate apart. Therefore, the stretched styrenic resin sheet is useful for the production of various molded articles (in particular, vessels, containers or other molded articles).

The present invention will now be illustrated in greater detail with reference to Examples, but it should be understood that the present invention is not construed as being limited thereto.

EXAMPLES

In Examples, the average particle size of the crosslinked styrenic particles is a 50% volume average particle diameter measured with a Coulter counter. The average particle size of the rubber component was evaluated as defined above. The characteristics of the stretched sheet prepared were evaluated and rated as follows.

1. Releasability (Blocking Resistance)

A biaxially stretched styrenic resin sheet was shaped into a container (opening top diameter: 90 mm; closed bottom diameter: 60 mm; height: 50 mm) on a thermo formmer (FK-0431-01 manufactured by Asano Seisakusyo). Twenty containers thus formed were stacked and cut with a die cutter under pressure. The height (h) of the stack with a load of 2 kg on and the height ($h_0$) with the load removed were measured to obtain a recovery (%) according to the following formula:

$$Recovery(\%)=[(h_0-h)/h]\times 100$$

The releasability of the formed articles was rated A to D according to the recovery as follows.

A . . . Not less than 30%

B . . . Not less than 20% and less than 30%

C . . . Not less than 10% and less than 20%

D . . . Less than 10%

2. Transparency

The haze of a 180 $\mu$m-thick sheet was measured with a haze meter manufactured by Suga Test Instruments Co., Ltd. The transparency was rated A to D according to the haze as follows.

A . . . Not higher than 1%

B . . . More than 1% and not more than 1.5%

C . . . More than 1.5 to 2.0%

D . . . More than 2.0%

3. The Number of Projections on the Surface

The number of projections having a height of 0.2 to 1 $\mu$m in the length of 20 cm of a sample sheet was measured with a two-dimensional surface roughness meter "Surfcom" manufactured by Tokyo Seimitsu Co., Ltd.

A . . . 151 or more

B . . . 101 to 150

C . . . 51 to 100

D . . . 50 or less

4. Silicone Oil Mark

Ten sheets of A4 size were laid one on another, and a load of 10 kg was placed thereon for 12 hours. The A4 sheet area was divided into 100 sections, and the proportion of the area having a map-like pattern was measured with the naked eye.

A . . . Not more than 5%

B . . . More than 5% and not more than 25%

C . . . More than 25% and not more than 50%

D . . . More than 50%

5. Scorching

The proportion of fish eyes due to resin scorching including coloration and contamination in all the fish eyes of 0.2 mm or greater in size was measured with the naked eye using a 50× magnifier.

A . . . Not more than 5%

B . . . More than 5% and not more than 25

C . . . More than 25% and not more than 50%

D . . . More than 50%

Preparation Example

[Preparation of Crosslinked Styrenic Fine Particles]

Into a vat were charged 1,860 g of water, 218 g of a 10-wt% aqueous solution of polyvinyl alcohol, 1,350 g of styrene, 20.4 g of divinylbenzene, and 13.5 g of lauroyl peroxide, and stirred with a homomixer at 5,000 rpm for 10 minutes to obtain a monomer preparation containing fine divided droplets.

1,120 g of water and 123 g of a 10-wt% aqueous solution of polyvinyl alcohol were charged into a 5-litter four-necked flask, and the inside was replaced by a nitrogen gas, and the temperature was increased to 70° C. The above-prepared monomer preparation was added thereto over a period of 2 hours. After completion of the addition, the mixture was allowed to stand at 80° C. for 4 hours to conduct polymerization and ripening. The resulting suspension was cooled to room temperature, and allowed to stand for 2 days. After the supernatant liquid was removed, the remaining contents were dried at 50° C. in a hot-air dryer. The dried powder and bulk were ground in a coffee mill, and then classified using an air classifier (a mini classifier manufactured by NPK Co., Ltd.) to obtain polymer beads having an average particle size of 4.3 $\mu$m.

Examples 1 to 4 and 11 to 14

A styrenic resin (polystyrene) was mixed with crosslinked styrenic fine particles having an average particle size of 8 $\mu$m (SBX-8, produced by Sekisui Plastics Co., Ltd.; Examples 1 to 4), 3 $\mu$m (SBX-3, produced by Sekisui Plastics Co., Ltd.; Examples 11 to 13) or 1 $\mu$m (SBX-1, produced by Sekisui Plastics Co., Ltd.; Example 14) in an amount shown in Tables 1 and 3, and the resulting resin composition was extruded from an extruder into a sheet. The sheet was stretched biaxially at a temperature of 125° C. and at a stretch ratio of 2.5 in each direction to obtain a 180 $\mu$m-thick biaxially stretched sheet. The surface of the stretched sheet was coated with silicone oil at a spread of 40 mg/m². The characteristics of the sheet are shown in Tables 1 and 3.

Comparative Examples 1 to 3

A biaxially stretched styrenic resin sheet was prepared in the same manner as in Example 1, except for using a resin composition obtained by changing a rubber component concentration and an average particle size of the rubber component contained in a rubber modified styrenic resin as shown in Table 1. The characteristics of the resulting sheet are shown in Table 1. As shown in Table 1, none of the-resulting sheets satisfied all the characteristic requirements.

TABLE 1

|  | Example 1 | Example 2 | Example 3 | Example 4 | Compara. Example 1 | Compara. Example 2 | Compara. Example 3 |
|---|---|---|---|---|---|---|---|
| Additive: | | | | | | | |
| Rubber Modified Styrenic Resin | | | | | | | |
| Average Particle Size of Rubber Component (μm) | | | | | 10 | 2.5 | 1.0 |
| Addition Amount in terms of Rubber Component (wt %) | | | | | 0.15 | 0.2 | 0.05 |
| Crosslinked Styrenic Particle | | | | | | | |
| Average Particle Size (μm) | 8 | 8 | 8 | 8 | | | |
| Addition Amount (wt %) | 0.05 (500 ppm) | 0.09 (900 ppm) | 0.1 (1000 ppm) | 1 (10000 ppm) | | | |
| Characteristics: | | | | | | | |
| Releasability | B | A | A | A | B | A | D |
| Transparency | A | A | B | B | C | B | A |
| Number of Projections | B | A | A | A | B | B | D |
| Silicone Oil Marks | A | A | A | A | B | A | D |
| Number of Fish Eyes due to Scorching | A | A | A | A | C | C | A |

Examples 5 to 10

A transparent styrenic resin was mixed with a rubber modified styrenic resin having a rubber content of 6 wt % (MC6560 produced by Chevron Chemical Company) having a varied average particle size as shown in Tables 2 and 3 so as to have a rubber concentration attributed to the rubber modified styrenic resin as shown in Tables 2 and 3. The mixture was further mixed with crosslinked styrenic fine particles having an average particle size as shown in Tables 2 and 3 (Technopolymer, produced by Sekisui Plastics Co., Ltd. or Microgel, produced by Nippon Paint Co., Ltd.) in an amount shown in Tables 2 and 3. The resulting resin composition was extruded from an extruder into a sheet and biaxially stretched at a temperature of 125° C. and at a stretch ratio of 2.5 in each direction to obtain a 180 μm thick biaxially stretched sheet. A surface of the stretched sheet was coated with silicone oil at a spread of 40 mg/m². The characteristics of the sheet are set forth in Tables 2 and 3.

Comparative Examples 4 to 7

A biaxially stretched styrenic resin sheet was prepared in the same manner as in Example 5, except for changing the rubber concentration and average particle size of the rubber modified styrenic resin and the amount and average particle size of the crosslinked styrenic fine particles as shown in Table 2. The characteristics of the resulting sheet are shown in Table 2.

TABLE 2

|  | Example 5 | Example 6 | Example 7 | Example 8 | Compara. Example 4 | Compara. Example 5 | Compara. Example 6 | Compara. Example 7 |
|---|---|---|---|---|---|---|---|---|
| Additive: | | | | | | | | |
| Rubber Modified Styrenic Resin | | | | | | | | |
| Average Particle Size of Rubber Component (μm) | 0.6 | 0.6 | 1.4 | 2.3 | 8.5 | 4.0 | 1.0 | 0.5 |
| Addition Amount in terms of Rubber Component (wt %) | 0.08 (800 ppm) | 0.04 (400 ppm) | 0.03 (300 ppm) | 0.01 (100 ppm) | 0.1 | 0.2 | 0.05 | 0.05 |
| Crosslinked Polystyrene Fine Particles | | | | | | | | |
| Average Particle Size (μm) | 6 | 6 | 6 | 6 | — | — | 50 | 0.1 |
| Addition Amount (wt %) | 0.01 (100 ppm) | 0.05 (500 ppm) | 0.01 (100 ppm) | 0.005 (50 ppm) | — | — | 0.02 | 0.02 |

TABLE 2-continued

|  | Example 5 | Example 6 | Example 7 | Example 8 | Compara. Example 4 | Compara. Example 5 | Compara. Example 6 | Compara. Example 7 |
|---|---|---|---|---|---|---|---|---|
| Characteristics: |  |  |  |  |  |  |  |  |
| Releasability | A | A | A | A | B | B | D | D |
| Transparency | B | B | B | B | C | D | D | C |
| Number of Projections | A | A | A | A | B | B | B | C |
| Silicone Oil Marks | A | A | A | A | D | B | D | D |
| Number of Fish Eyes due to Scorching | A | A | A | B | B | B | B | B |

TABLE 3

| Example | Example 9 | Example 10 | Example 11 | Example 12 | Example 13 | Example 14 |
|---|---|---|---|---|---|---|
| Additive: |  |  |  |  |  |  |
| Rubber Modified Styrenic Resin |  |  |  |  |  |  |
| Average Particle Size of Rubber Component ($\mu$m) | 2.3 | 3.0 | — | — | — | — |
| Addition Amount in terms of Rubber Component (wt %) | 0.02 (200 ppm) | 0.02 (200 ppm) | — | — | — | — |
| Crosslinked Polystyrene Fine Particles |  |  |  |  |  |  |
| Average Particle Size ($\mu$m) | 6 | 6 | 3 | 3 | 3 | 1 |
| Addition Amount (wt %) | 0.003 (30 ppm) | 0.001 (10 ppm) | 0.005 (50 ppm) | 0.003 (30 ppm) | 0.001 (10 ppm) | 1 (10000 ppm) |
| Characteristics: |  |  |  |  |  |  |
| Releasability | A | B | B | B | B | B |
| Transparency | B | B | A | A | A | B |
| Number of Projections | A | B | B | B | B | A |
| Silicone Oil Marks | A | B | B | B | B | A |
| Number of Fish Eyes due to Scorching | B | B | A | A | A | A |

As having been fully described and demonstrated, since the styrenic stretched sheet of the present invention has fine unevenness uniformly on the surface thereof, silicone oil can uniformly be applied thereon, and the sheet exhibits improved blocking resistance while retaining its transparency and avoiding deterioration in appearance and breaks which have conventionally been caused by foreign matter due to thermal deterioration of a rubber component. Therefore, even when formings (molded articles) obtained from the sheet are stacked, they are easily separated apart without blocking.

While the invention has been described in detail and with reference to specific examples thereof, it will be apparent to one skilled in the art that various changes and modifications can be made therein without departing from the spirit and scope thereof.

What is claimed is:

1. A styrenic resin composition for a biaxially stretched sheet, which composition comprises:
    (A) a styrenic resin comprising at least one monomer unit derived from styrene monomers, further comprising other monomers copolymerizable with the styrene monomer selected from the group consisting of acrylonitrile, methyl methacrylate, and maleic anhydride; and;
    (B) crosslinked styrenic fine particles having an average particle size of 1 to 10 $\mu$m and a refractive index such that the haze value of the resin composition is not more than 1.5%, in an amount of from 0.01 to 0.09% by weight based on the total weight of the resin composition.

* * * * *